United States Patent
He et al.

(10) Patent No.: US 10,154,243 B2
(45) Date of Patent: Dec. 11, 2018

(54) METHOD AND APPARATUS FOR CUSTOMIZING 3-DIMENSIONAL EFFECTS OF STEREO CONTENT

(75) Inventors: Shan He, Princeton, NJ (US); Tao Zhang, Sunnyvale, CA (US)

(73) Assignee: INTERDIGITAL MADISON PATENT HOLDINGS, Paris (FR)

( * ) Notice: Subject to any disclaimer, the term of this patent is extended or adjusted under 35 U.S.C. 154(b) by 365 days.

(21) Appl. No.: 13/805,500

(22) PCT Filed: Jun. 23, 2011

(86) PCT No.: PCT/US2011/041574
§ 371 (c)(1),
(2), (4) Date: Dec. 19, 2012

(87) PCT Pub. No.: WO2012/005962
PCT Pub. Date: Jan. 12, 2012

(65) Prior Publication Data
US 2013/0093849 A1   Apr. 18, 2013

Related U.S. Application Data

(60) Provisional application No. 61/359,342, filed on Jun. 28, 2010.

(51) Int. Cl.
*H04N 13/00* (2018.01)
*H04N 13/139* (2018.01)
*H04N 13/128* (2018.01)

(52) U.S. Cl.
CPC ......... *H04N 13/139* (2018.05); *H04N 13/128* (2018.05)

(58) Field of Classification Search
CPC ........... H04N 13/0018; H04N 13/0022; H04N 13/0029; H04N 13/128; H04N 13/139
(Continued)

(56) References Cited

U.S. PATENT DOCUMENTS 7,616,885 B2   11/2009   Chen et al.
2002/0180734 A1   12/2002   Endoh et al.
(Continued)

FOREIGN PATENT DOCUMENTS

AU   2003268677   4/2004
CN   1154073   6/2004
(Continued)

OTHER PUBLICATIONS

"Nintendo's 3DS Brings Dizzying Fun on the Go", The Wall Street Journal (wsu.com), by Katherine Boehret, http://online.wsj.com/article/SB10001424052748704662604576202673930040228.html.
(Continued)

*Primary Examiner* — Farzana Hossain
(74) *Attorney, Agent, or Firm* — Lily Neff

(57) ABSTRACT

A method and system for adjustable 3-dimensional content are described in which a viewer can adjust the depth range according to the viewer's own visual comfort level and/or viewing preference. The depth change is achieved by shifting the left and right images of stereoscopic content image pairs so that corresponding pixels in the shifted left and right images of a stereoscopic pair exhibit a new horizontal disparity sufficient to achieve the desired depth change. By shifting the left and right images in an image pair, content objects in the scene can appear closer to, or farther away from the viewer than those same objects in the un-shifted image pair. This technique achieves a viewer controlled customization of the sensation of depth in the stereoscopic 3-dimensional content.

26 Claims, 10 Drawing Sheets

(58) Field of Classification Search
 USPC .......................................................... 348/43
 See application file for complete search history.

(56) References Cited

U.S. PATENT DOCUMENTS

| | | | |
|---|---|---|---|
| 2005/0190180 A1* | 9/2005 | Jin et al. ........................ | 345/419 |
| 2006/0192776 A1 | 8/2006 | Nomura et al. | |
| 2006/0290778 A1 | 12/2006 | Kitaura et al. | |
| 2007/0047040 A1 | 3/2007 | Ha et al. | |
| 2007/0052794 A1 | 3/2007 | Ha et al. | |
| 2007/0081716 A1 | 4/2007 | Ha et al. | |
| 2008/0112616 A1 | 5/2008 | Koo et al. | |
| 2010/0039502 A1* | 2/2010 | Robinson ........................ | 348/47 |
| 2010/0039504 A1 | 2/2010 | Takahashi et al. | |
| 2010/0073465 A1 | 3/2010 | Park et al. | |
| 2010/0091098 A1* | 4/2010 | Yoshifuji et al. ............... | 348/54 |
| 2010/0103249 A1* | 4/2010 | Lipton et al. ................... | 348/51 |
| 2011/0169818 A1* | 7/2011 | Pan et al. ...................... | 345/419 |

FOREIGN PATENT DOCUMENTS

| | | |
|---|---|---|
| CN | 1956554 | 5/2007 |
| EP | 1489857 | 12/2004 |
| JP | 8317429 | 11/1996 |
| JP | 2004207772 | 7/2004 |
| JP | 2004208255 | 7/2004 |
| JP | 2004246725 | 9/2004 |
| JP | 2004289527 | 10/2004 |
| JP | 2004349736 | 12/2004 |
| JP | 2005073049 | 3/2005 |
| JP | 2006262191 | 9/2006 |
| JP | 2010045584 | 2/2010 |
| KR | 1020060134309 | 12/2006 |
| TW | 200816800 | 1/2008 |
| TW | 1312634 | 7/2009 |
| WO | WO2004030377 | 4/2004 |
| WO | WO2005060271 | 6/2005 |

OTHER PUBLICATIONS

Jones et al. "Controlling Perceived Depth in Stereoscopic Images," Sharp Laboratories of Europe Ltd., Oxford, UK, 12 pages.

Mendiburu, "3D Movie Making, Stereoscopic Digital Cinema from Script to Screen," Focal Press (Imprint of Elsevier), Oxford, UK, 11 pages.

Masaoka et al., "Spatial distortion prediction system for stereoscopic images," Journal of Electronic Imaging, 013002, Jan.-Mar. 2006/vol. 15(1), 12 pages.

Woods et al., "Image Distortions in Stereoscopic Video Systems," Proceedings of the SPIE vol. 1915, Stereoscopic Displays and Applications IV, San Jose, CA, Feb. 1993, 12 pages.

* cited by examiner

METHOD AND APPARATUS FOR CUSTOMIZING 3-DIMENSIONAL EFFECTS OF STEREO CONTENT

CROSS-REFERENCE TO RELATED APPLICATIONS

This application is a National Stage Application and claims the benefit, under 35 U.S.C. § 365 of International Application PCT/US2011/041574 filed Jun. 23, 2011 which was published in accordance with PCT Article 21(2) on Jan. 12, 2012 in English, and which claims the benefit of U.S. Provisional Patent Application No. 61/359,342 filed on Jun. 28, 2010.

TECHNICAL FIELD

The present invention relates to three dimensional (3D) image presentation systems and, more particularly, to customizing a perceived depth in a 3D scene to a viewing preference.

BACKGROUND OF THE INVENTION

Three-dimensional (3D) movies have been consistently released in growing numbers. As popularity of 3D content expands in theaters, there are increasing efforts aimed at expanding a similar 3D experience to the home environment, particularly, through the advent of 3D television.

Recently, television programming has become more widely available in 3D. Sporting events and concerts have been broadcast for home consumption. 3D component sales hold the key to further increases for 3D presentations targeting the home theater environment. As 3D component sales ramp up and as the demand for 3D grows, it is expected that 3D programming will be offered widely on most of the popular TV channels and in recorded media in the near future.

But there are some challenges to growing the 3D television market. 3D television in home theater environment offers considerably smaller screen sizes and considerably smaller viewing distances than the screen sizes and viewing distances found in movie theaters. This translates into greater restrictions on the 3D content delivered to a 3D television. For example, the 3D television in a home theater will restrict the depth range to be smaller than that allowed in most movie theaters.

In movie theaters, 3D effects can be created on a grand scale so that elements in a scene appear to pop all the way out of the screen into each audience member's seat, while other elements in the same scene appear to be far off in the distance well behind the screen. Most people can enjoy watching 3D scenes that appear behind the screen for a relaxed viewing experience. For some audience members, these lifelike and greater-than-lifelike effects can be quite enjoyable; for other audience members, these same effects can be uncomfortable at best. In other words, different people have different comfort ranges of depth when viewing 3D content.

At the present time, there is no known technique for adapting or for optimizing a 3D presentation to a user's preferences, especially with respect to depth. Hence, an automated method to adjust and customize the depth of 3D content for viewing preferences can be expected to improve the viewing experience of the 3D content.

SUMMARY OF THE INVENTION

Stereoscopic 3D presentation of image content is adapted to a viewer's preferences in accordance with principles of the present invention by adjusting, in response to viewer control signal, the horizontal disparity of the first and second views of a received stereoscopic image pair from a first value to a second value related to a parameter or information included in the viewer control signal. In this way, the viewer is able to adjust the depth range according to the viewer's own visual comfort and/or viewing preference. This technique allows customization of the sensation of depth in the stereoscopic 3D content.

The change of depth perception is achieved by horizontally shifting the left and right images of stereo content. By shifting the left and right images of a stereoscopic image pair, the disparity associated with a scene can be changed, resulting in the content of the scene being perceived to be displayed closer to, or farther away from, the viewer. In order to retain a proper relationship of scale for elements or objects in a scene, up- or down-scaling of the content, i.e., size adjustments of the objects, in each image pair is also performed based on the depth change direction.

Thus, one aspect of the invention provides a method for presenting stereoscopic content having a plurality of stereoscopic image pairs. The method includes receiving at least a first stereoscopic image pair having a first view and a second view, the first and second views including at least a pair of corresponding pixels separated by a first horizontal disparity, and adjusting, in response to a control signal, sizes of the first and second views by a scale factor and the first horizontal disparity to a second horizontal disparity to produce adjusted first and second views.

Another aspect of the invention provides a system for use in presenting stereoscopic content, and includes at least one processor configured for receiving at least a first stereoscopic image pair having a first view and a second view, the first and second views including at least a pair of corresponding pixels separated by a first horizontal disparity. The at least one processor is further configured for adjusting, in response to a control signal, sizes of the first and second views by a scale factor and the first horizontal disparity to a second horizontal disparity to produce adjusted first and second views.

The details of one or more implementations are set forth in the accompanying drawings and the description below. Even if described in one particular manner, it should be clear that implementations may be configured or embodied in various manners. For example, an implementation may be performed as a method, or embodied as an apparatus configured to perform a set of operations, or embodied as an apparatus storing instructions for performing a set of operations. Other aspects and features will become apparent from the following detailed description considered in conjunction with the accompanying drawings and the claims.

BRIEF DESCRIPTION OF THE DRAWINGS

The above-mentioned and other features and advantages of this invention, and the manner of attaining them, will become more apparent and the invention will be better understood by reference to the following description of embodiments of the invention taken in conjunction with the accompanying drawings, wherein.

The exemplary embodiments set out herein are understood to illustrate preferred embodiments of the invention, and such exemplary embodiments are not to be construed as limiting the scope of the invention in any manner.

DETAILED DESCRIPTION

Embodiments of this invention provide a method and system for adjustable 3D content, in which a viewer can adjust the depth range according to the viewer's own visual comfort level and/or viewing preference. The depth change is achieved by shifting the left and right images of stereoscopic content image pairs so that shifted image pairs exhibit a new horizontal disparity sufficient to achieve the desired depth perception. By shifting the left and right images in an image pair, content objects in the scene can appear closer to, or farther away from the viewer than those same objects in the unshifted image pair. This technique allows a customization of the sensation of depth in the stereoscopic 3D content.

The sensation or perception of depth is directly related to the horizontal disparity between the two image views (i.e., left and right image views) because of the binocular nature of the viewing process. Binocular here is intended to encompass broadly viewing from two distinct positions, regardless of whether the viewing is performed by eyes or by cameras. Horizontal disparity or simply, disparity, for an object in 3D video refers to the horizontal separation, usually measured in a number of pixels, between the left- and right-eye images of a stereoscopic image pair. Zero disparity occurs when the right image view coincides with the left image view. Objects in these image views will then appear at the display screen. Positive disparity indicates that the right-eye pixels appear to the right of the left-eye pixels from the corresponding images. Objects exhibiting positive disparity generally appear behind the viewing screen. Negative disparity indicates that the right-eye pixels appear to the left of the left-eye pixels in the corresponding images. Objects exhibiting negative disparity will appear in front of the viewing screen.

Figure 5:
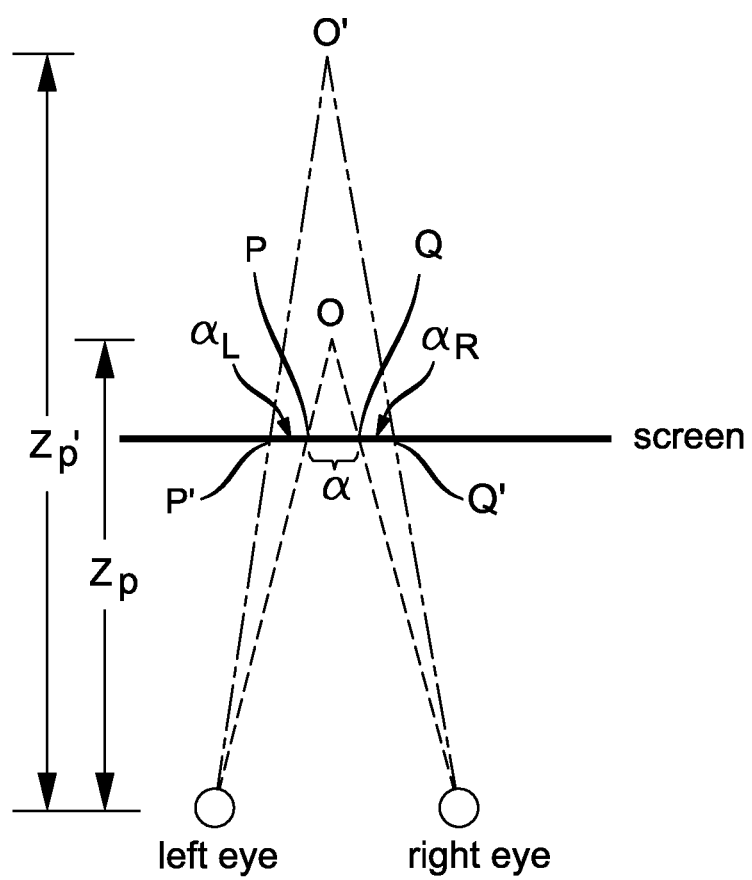
FIG. 5 depicts changes in depth versus disparity for an object viewed in 3D.

This concept is illustrated at least in part in FIG. 5. In this figure, the disparity is associated with the object O. Disparity is defined for each pixel in the image with reference to the left and right views. Different pixels, even for the same object in an image, may have different disparity values. Disparity, shown as d of the figure, is measured as the difference between the left eye's pixel and the right eye's pixel in the image of the object O. Disparity is usually expressed as a number of pixels. Since the pixel in the right eye image is to the right of the corresponding pixel in the left eye image, the illustrated disparity is a positive number. When the disparity is increased by shifting both the left eye image from point P left to point P' and the right image from point Q right to point Q', a new disparity for O is measured as the number of pixels between point P' and point Q'. Since the pixel in the right eye image is still to the right of the pixel in the left eye image, the new illustrated disparity is also a positive number. In this example, the object O is pushed farther away from the viewer, as shown by its new position at O'.

At times in this application, disparity may be described with reference to the shifting or the left and right images with respect to each other or with respect to a reference point. It should be understood by persons skilled in the art that these description serve as an accurate shorthand description of the shifting process because the images include the left and right image pixels upon which the disparity measurement is based. Thus, shifting of images is intended to be synonymous, and coextensive in meaning, with shifting of image pixels.

In the literature, parallax and disparity are usually used interchangeably. In the context of this invention, the disparity for an object in the 3D video refers to the horizontal separation, in number of pixels, between the left- and right-eye images, while parallax refers to the actual distance between the left- and right-eye images when displayed. Therefore, the parallax value of an object depends on both the disparity of the object and the display size. For a fixed display size, the parallax is equivalent to the disparity, and is related to each other by a constant factor.

Figure 1:
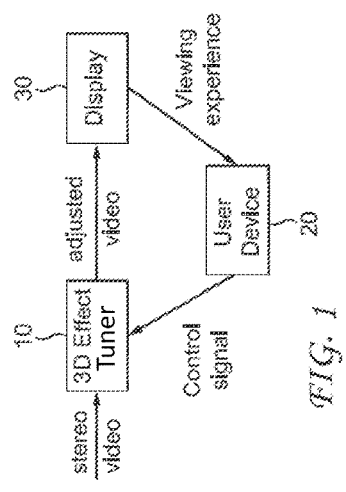
FIG. 1 is a simplified block diagram of a system for adjusting the user 3D viewing experience realized in accordance with the principles of the present invention.

FIG. 1 is a simplified block diagram of a system for adjusting the user 3D viewing experience realized in accordance with the principles of the present invention. The system in FIG. 1 includes 3D effect tuner 10, user device 20, and display 30. The 3D effect tuner 10 processes an input stereo video frame in response to a viewer's control signal or instruction from user device 20. 3D effect tuner 10 adjusts the viewing experience for the stereo video frame as instructed by the control signal. 3D effect tuner 10 then supplies the adjusted stereo video frame to a display for presentation to the viewer.

While watching the displayed content, the viewer can send one or more control or adjust signals (or instructions) to the 3D effect tuner to further adjust the content based on his/her viewing preference. Specifically, the 3D content can be adjusted, based on the control signal, to suit the viewer's preference of depth perception by shifting at least one of the displayed stereoscopic images (i.e., left- and/or right-eye images or views) horizontally. Furthermore, scaling of depth-adjusted images can be performed to adjust the size of objects in the scene in order to account for the depth change adjustment.

As mentioned briefly above, the input stereo video includes a left view video and a right view video. Each frame in the left view video has one corresponding frame in the right view video, thus forming a pair of frames. During processing in the system described herein, each pair of the frames is input in 3D effect tuner 10 for adjustment.

Figure 2:
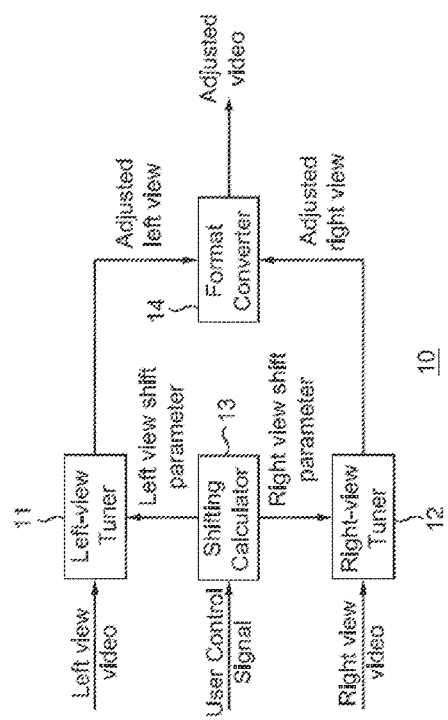
FIG. 2 is a more detailed block diagram of a 3D effect tuner in FIG. 1 realized in accordance with the principles of the present invention.

FIG. 2 is a more detailed block diagram of the 3D effect tuner 10 in FIG. 1 realized in accordance with the principles of the present invention. 3D effect tuner 10 includes a left-view tuner 11, a right-view tuner 12, a shifting calculator 13, and a format converter 14. Tuners 11 and 12 are each coupled to shifting calculator 13 to receive a shift parameter. The output from each tuner is coupled to the format converter 14.

Each stereoscopic 3D image pair received by 3D effect tuner 10 is separated into its two components, a left view image and a right view image. Upon receipt of a control signal from the user device 20, shifting calculator 13 calculates at least one shift parameter $\alpha_v$, where subscript v is either L or R, i.e., the shift parameter includes $\alpha_L$, the shift parameter for the left view, and $\alpha_R$, the shift parameter for the right view. Shifting calculator 13 calculates the shift parameter $\alpha_v$ based, at least in part, on the control signal received from the user device. The control signal from user device 20 may be generated to indicate a depth change requested by the viewer. In one embodiment (discussed in more details below in connection with FIG. 6), the control signal includes a control parameter related to the viewer's desired depth change.

The control signal may also include ancillary information identifying the viewer or the user device. In other instances, the control signal may identify other individual viewers or groups of viewers. This ancillary identification information can then be used by the 3D effect tuner in other embodiments to retrieve stored profile or viewing preference information for the individual or groups of individuals identified in the signal. It is contemplated that such viewing preference and user profile information would include information related to a preferred depth range at which the viewers prefer to see stereoscopic 3D images.

It is contemplated that viewers may have already interacted with a portion of the system to create a profile or viewing preference list that reflects, at least in part, viewing information such as information related to a depth range. In such a case, a specific viewer's control signal could simply identify the viewer or viewing group, which in turn would cause the system to retrieve from storage (not shown) one or more items of viewer information indicating the preferred depth range. This depth range would then be supplied to shifting calculator to generate the shift parameter $\alpha_v$ for the left and right views for implementing the corresponding depth change that is required.

Instead of calculating the shift parameter $\alpha_v$ in response to the viewer control signal, the shift parameter $\alpha_v$ can also be selected from a defined look-up table listing to generate each corresponding shift parameter of the left ($\alpha_L$) and right ($\alpha_R$) views, which are then sent to the corresponding left-view tuner or right-view tuner. The defined list of shift parameters is generated to cover a particular depth change or image shifting range considered reasonable or suitable for most viewers and most viewing environments.

Each shift parameter $\alpha_L$ or $\alpha_R$ is a positive or negative number. The magnitude of $\alpha_v$ represents an amount of image shift, while the sign of $\alpha_v$ represents the direction of shift for the related video image. The predefined list of shift parameters can be provided within a range considered reasonable or suitable for most viewers.

The shift parameter range, whether calculated or in a defined list, depends on at least several different factors. These factors include the size of the display screen, the viewing distance between the viewer and the screen, as well as the viewer's preference or other such characteristics. In one example from experimental practice, image shifts over a range from −300 to +300 pixels is considered generally sufficient to satisfy the viewing preference for most viewers under typical viewing conditions. Other ranges may be more suitable as viewers and their viewing environments change.

Left-view tuner 11 and right-view tuner 12 process the corresponding left- and right-view video images based on the respective shift parameter $\alpha_v$ supplied by shifting calculator 13. Each tuner then supplies the adjusted left and right view to format converter 14 to generate a displayable video input for display 30 in a suitable stereoscopic video format.

Examples of video frame formats for stereoscopic 3D content display are well known in the technical field of this invention and in related technical standards organizations. These formats include, but are not limited to full frame format, checkerboard format, interleaved format, side by side format, and top and bottom format. In the full frame format, left- and right-eye images are alternately formatted in full resolution in separate frames. In the checkerboard format, each 2-by-2 pixel window in one frame contains 2 pixels from one eye-view forming the diagonal of the window and 2 pixels from the other eye-view forming the off-diagonal of the same window. The interleaved format is a row-based format in which left- and right-eye images are displayed at the same time, but in different alternating rows of pixels. In the side by side format, left- and right-eye images are arranged side by side, whereas for the top and bottom display the left- and right-eye images are arranged one over the other. All the frame formats, except the full frame format, compress both image views into a single frame in the specific configurations mentioned above.

Display 30 converts these formats into the native display format for presentation to the viewer on the display screen. It is understood that the format can also include embedded information, metadata, and even ancillary files conveying other information such as display resolution, aspect ratio, and the like.

Figure 3A:
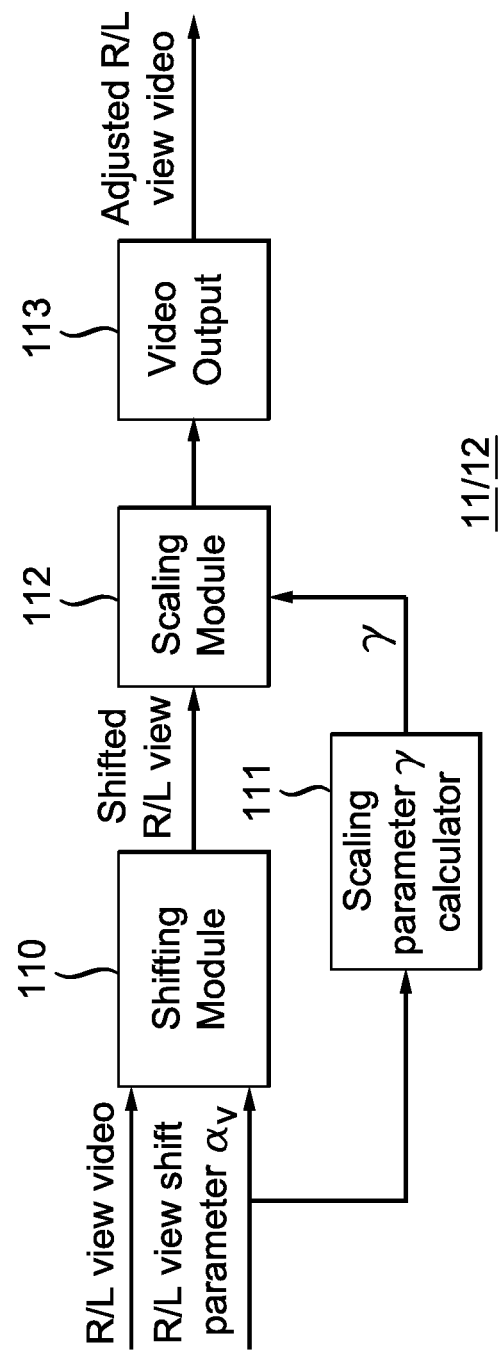
FIGS. 3A-3C depict, in further detail, a block diagram for each view tuner shown in FIG. 2 realized in accordance with the principles of the present invention.
Figure 3B:
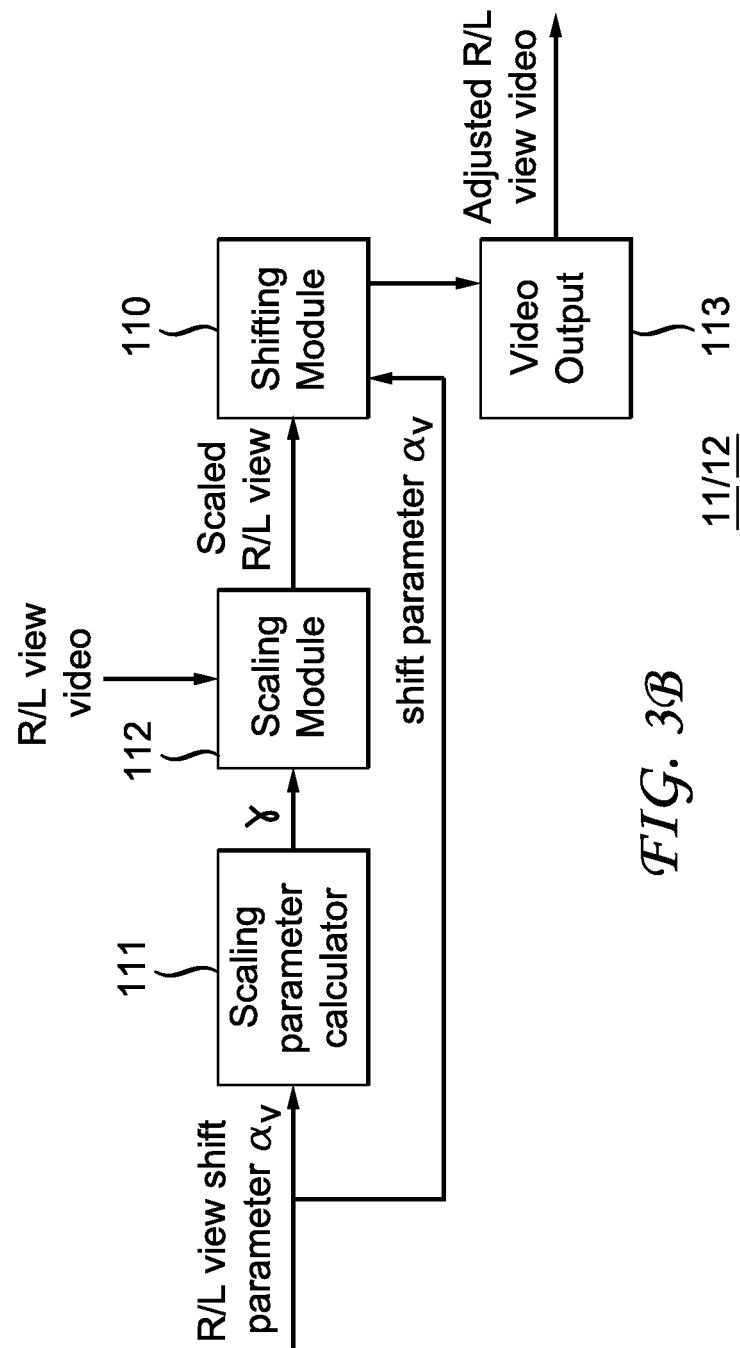
Figure 3C:
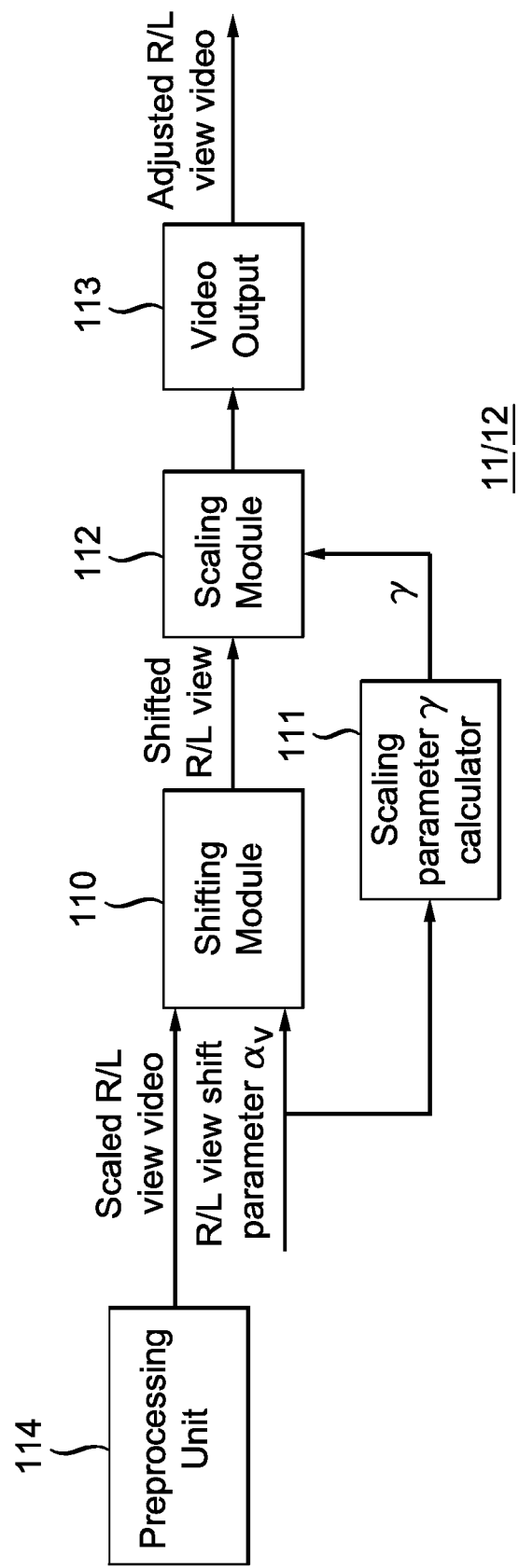

FIGS. 3A, 3B and 3C depict, in further detail, a block diagram representation for each view tuner 11 and 12 shown in FIG. 2. As depicted in FIG. 3A, left/right-view tuner includes a shifting module 110, a scaling module 112, a scaling parameter calculator 111, and a video output element 113.

Shifting module 110 includes a processor for performing shifting of the input left or right video frame (image). Image shifting is performed in a horizontal direction by an amount $\alpha_v$, where subscript v can indicate a left view/image (L) or a right view/image (R) for the shift parameter. The shift parameter generally indicates the shift amount in a number of pixels, while the sign of the shift in $\alpha_v$ indicates the shifting direction for the image. In one embodiment, the left and right views are shifted by an equal amount in opposite directions, i.e., $\alpha_R = -\alpha_L$, to achieve a desired perceived depth for the resulting 3D image. It is also possible that the left and right views be shifted by different amounts, or by shifting only one view (i.e., one of the shift parameters is zero).

Scaling module 112 also includes a processor for scaling the shifted video to produce a more natural look of the stereo content (e.g., content that has been shifted farther away may be scaled to a smaller size). The scaling parameter $\gamma$, which is used in this scaling operation, is generated by scaling parameter calculator 111 in response to the shift parameter $\alpha_v$. Thus, the scaling parameter is ultimately based, to a degree, on the control signal from the user device.

Although the exemplary embodiment shown in FIG. 3A depicts scaling being performed after image shifting, it is understood from the linear nature of these transform operations that image scaling may also be performed before image shifting. This alternate exemplary embodiment is illustrated in FIG. 3B. Since the scaling parameter depends at least in part on the shift parameter, it is understood that the embodiment in FIG. 3B shows the scaling parameter calculator 111 preceding the scaling module 112. Further, the left- and right-view video images are supplied to scaling module 112 instead of shifting module 110.

It is understood that the 3D effect tuner and the various modules and processing units depicted in these figures include components such as one or more processor and storage devices configured for performing any or all of the functions associated the 3D effect tuner, when realized in accordance with the principles of the invention.

FIG. 3C also depicts another exemplary embodiment of the 3D effect tuner. In this embodiment, preprocessing unit 114 precedes the arrangement of elements from FIG. 3A. It is understood that preprocessing unit 114 could have been added to the arrangement shown in FIG. 3B. The preprocessing unit 114 receives left and right view video (shown in FIG. 2) and scales the respective video by an amount sufficient to increase the pixel count or resolution of the image. In other words, the preprocessing unit creates a larger left or right view video frame to accommodate the shifting operation to be performed on that particular view video.

This scaling operation is distinct from the scaling performed by scaling module 112. As further discussed below, the scaling module 112 adjusts the sizes (increase or decrease) of the left and right views to provide a more natural look consistent with the depth change for any given scene. The preprocessing unit 114 increases the size or resolution of the left and right views, in order to avoid or minimize the need for zero padding in the output video (e.g., zero padding may be required in a region of the output frame that becomes devoid of content after shifting of the left or right view). While the scaling by scaling module 112 is performed on any (one or more) scenes that have been adjusted in depth or disparity and the scaling factor is related to the disparity or depth adjustment, the size increase by the preprocessing unit 114 is preferably performed only once (e.g., before other processing such as shifting of the left and right views of the first scene of the content), regardless of the disparity or depth adjustment. However, the preprocessing unit can also perform further size increase for subsequence scenes, if desired. To avoid possible confusion, the scaling performed by the preprocessing unit 114 is also referred to as "view scaling", and will be discussed in further detail with respect to FIG. 4.

Shifting module 110 shifts the input left/right view video horizontally by $\alpha_v$ pixels. Depending on the input video, there are at least three possible cases encountered during the processing of input video by the shifting module. These cases are shown in more detail in FIGS. 4A-4F, which show comparisons of the input video frame and the output video window under differing conditions for each 3D view.

Figure 4A:
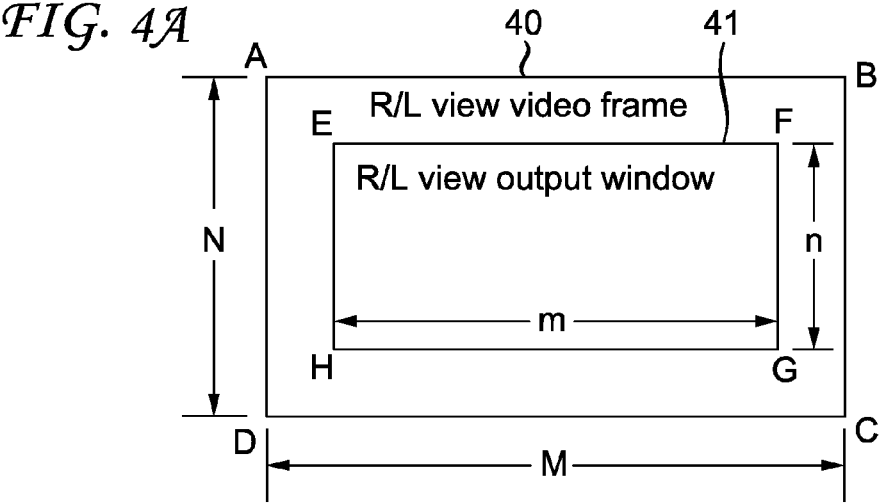
FIGS. 4A-4F show comparisons of the input video frame and the output video window under differing conditions for each 3D view.

FIG. 4A shows a first case in which the input video frame ABCD (frame 40) has a size or resolution that is larger than the size or resolution supported by the display, which is depicted as output window 41. In FIG. 4A, the input video frame ABCD (frame 40) has a resolution or size denoted as M by N, representing a width of M pixels in the horizontal direction and a height of N pixels in the vertical direction. The view output window 41 of the display for the left and right views is shown as output window EFGH with a resolution or size denoted as m by n, representing a width of m pixels in the horizontal direction and a height of n pixels in the vertical direction. In this scenario for FIG. 4A, the frame and window dimensions are related as follows, M>m, and N>n.

In the description of FIG. 4A, it will be understood that the output video window 41 establishes the scope of information that is viewable from the input video frame 40. When the shift operation is discussed, it is further understood that the pixel shift can actually be envisioned as a shift of the output video window over the input video frame to a new position depicted as shifted output video window 41' in FIGS. 4B and 4C, for example. This operation may also be described herein as a shift of the video image. Of course, one can understand that the shift operation can be understood as a shift of the window over image or a shift of the image under the window. These are interchangeable concepts that still result in the same outcome, namely a shifted left or right view video image. Both concepts are described interchangeably herein without contradiction or any intended limitation on the inventive principles.

Figure 4B:
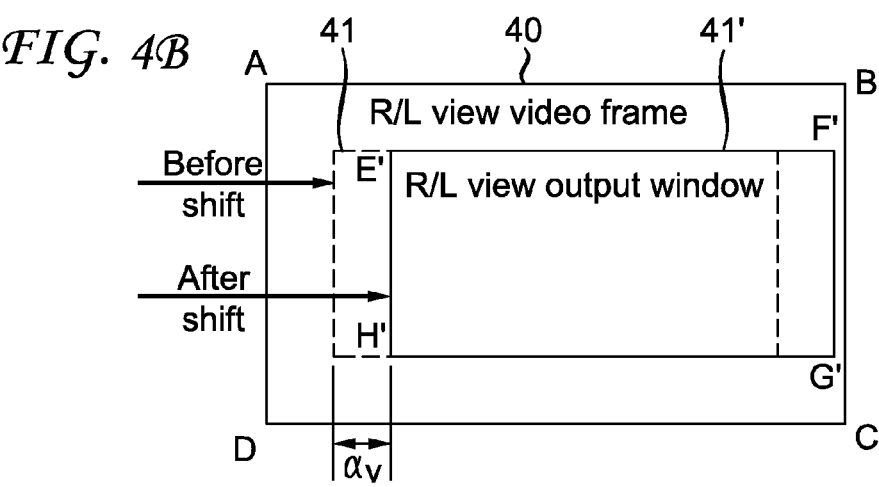

Since depth perception is affected only by the horizontal disparity of the two views (left and right), shifting module 110 perform only horizontal shifting. Thus, the description of the invention herein focuses on the horizontal resolutions and dimensions of the input video and the displayed video. In this example, the horizontal dimension of the input video frame is larger than that of the output window EFGH (i.e., the display video frame), as shown by M>m. If the display video is shifted by $\alpha_v$ pixels such that the shifted video frame E'F'G'H' is still within the input video frame ABCD as shown in FIG. 4B, the displayed video will correspond to the portion that is marked the output window 41' (i.e., E'F'G'H').

Figure 4C:
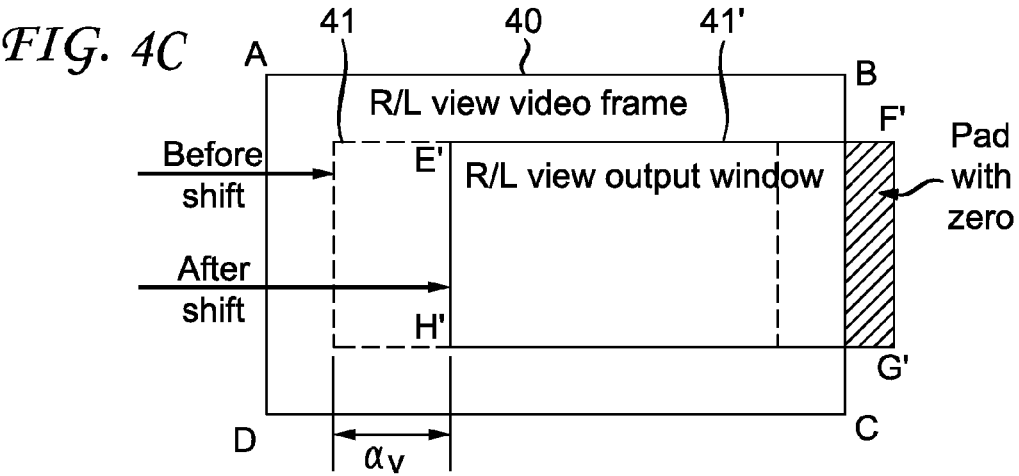

If the shift parameter is too large so that, after the shifting operation, the output window E'F'G'H' extends beyond the limits of the input video frame 40, zero-padding is used to fill in the gap shown in the shaded region in FIG. 4C. Other suitable fill techniques can be substituted for zero-padding. Zero padding is used in this case because the gap portion of shifted output window 41' does not cover any input video content. When the pixels in this gap region are set to zero, they will appear as black. The output video view supplied to the display corresponds then to E'F'G'H', including a dark shaded portion of zero padded pixels.

Since the right- and left-views can be shifted in opposite directions, it is possible that the content in the shifted right- and left-views can become sufficiently different from each other that cropping of the right- and left-views (in addition to zero padding) is required to ensure that both views have substantially the same content.

Figure 4D:
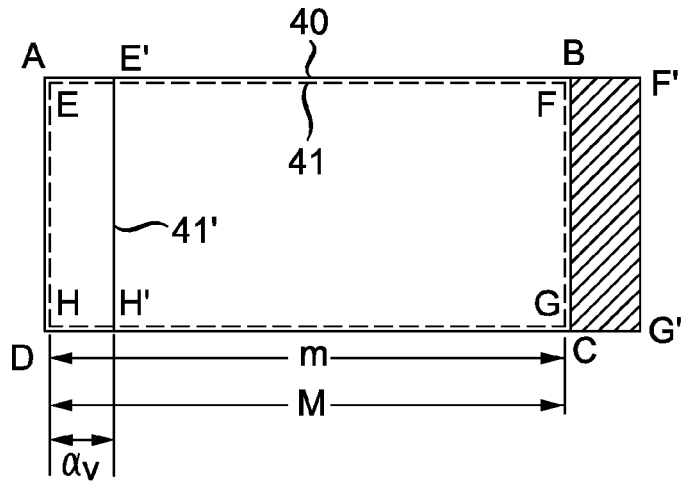

FIG. 4D shows a second case in which at least the horizontal dimension or resolution of the input video frame ABCD (frame 40) is equal to that of the output window EFGH (window 41), so that M=m. While it is convenient but not necessary for this example, frame 40 also has vertical resolution equal to that of the output window 41 so that n=N. In this example, any non-zero shift value of $\alpha_v$ in either the left- or right-view, always causes the shifted output window 41', shown as video output window frame E'F'G'H', to fall outside the boundaries of input video frame 40. Zero-padding or any other suitable fill technique is used to fill in the gap portion, as shown in the shaded portion of FIG. 4D.

Figure 4E:
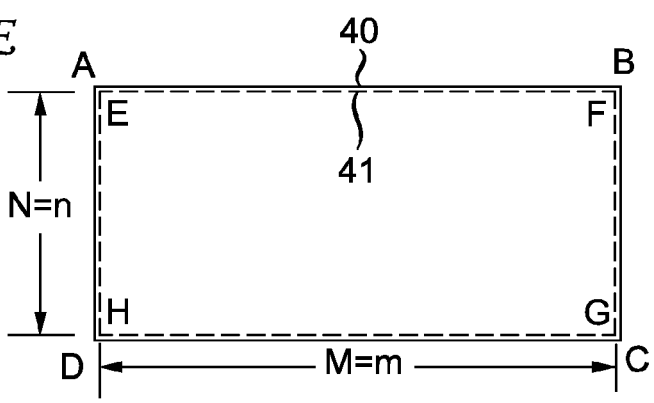

FIG. 4E illustrates another example in which the dimensions of the original input video frame ABCD (frame 40) matches the dimensions of the output window EFGH (window 41), so that M=m, and N=n. Instead of providing this original input video frame ABCD directly to the left- and right-view tuners for processing as described in relation to FIG. 4D, the input video frame ABCD is first subjected to a view scaling operation by preprocessing unit 114 so that its dimensions of each image view (i.e., left and right) are each scaled up by a view scaling factor from their original dimensions, M×N to larger dimensions M'×N', where M'>M and N'>N. Again, it should be noted that this view scaling is different from the scaling operation performed by the scaling module 112 shown in FIGS. 3A, B, and C. View scaling may be applied to input video images regardless of the relationship between the input video frame size or resolution M and the output window size m. It should be appreciated that a larger input video frame size in relation to the output window size decreases potential for a gap after image shifting, which in turn decreases the possible need for zero padding in the gap.

Figure 4F:
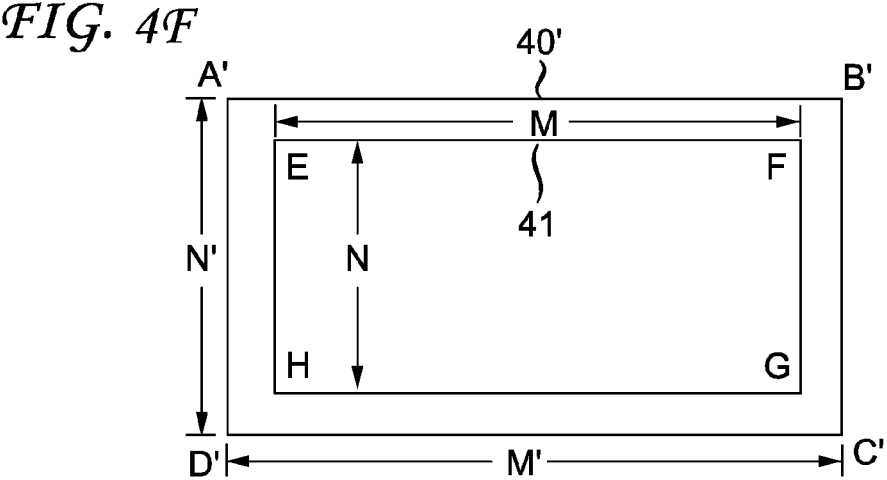

In this example, the input video frame ABCD is increased so that its dimensions are larger than those of the output window EFGH, as shown in FIG. 4F. Subsequent shifting operations follow the same steps as described for the first case with respect to FIGS. 4B and 4C. The view scaling factor M'/M can be the same as, or different from, the view scaling factor N'/N. If the view scaling factors M'/M and N'/N are the same, then the aspect ratio of the input video frame is preserved.

In an example from experimental practice, it is found that the shift module can include a processor for performing this scaling for the input video frame. Alternatively, this view scaling can be performed by a pre-processing unit, as shown in FIG. 3C.

In FIG. 3C, the pre-processing unit 114 is provided upstream of the shifting and scaling modules. In this configuration, the pre-processing unit includes a processor for performing dimensional scaling of the input video frame. The scaled right-/left-view video frame from the pre-processing unit 114 is then provided as input to the shifting module for further processing.

Scaling module 112 is introduced to improve the appearance of the video that has been adjusted for depth perception by image shifting. It has been observed that simple image shifting can cause a "scale-down" or "scale-up" effect. The presence of such scaling effects results in certain objects appearing smaller than they should because the shift brings these objects closer to the viewer, while other objects appear larger than they should when they have been shifted farther away from the viewer. In order to alleviate this effect, a scaling module 112 is used in conjunction with the shifting process to produce a more natural look of the depth adjusted video. In other words, the scaling or size adjustment operation in module 112 is performed on the scene (or all pixels in the frame) whose images have been shifted, so that the size of all objects in the scene is adjusted to counteract the observed scale-down and scale-up effect. This scaling operation can be performed prior to or after the right- and/or left-images have been shifted by the shifting module, as shown in FIGS. 3A, 3B and 3C. Furthermore, this scaling does not have to be performed on the entire original content in the left or right images. For example, if the input video frame is larger than the display screen size, then scaling can be performed only for the portion of the content that will be visible on the screen.

In order to determine the scaling factor $\gamma$ for use in scaling module 110, a camera model formulated in the following equation can be used:

$$\begin{bmatrix} x \\ y \\ 1 \end{bmatrix} = \begin{bmatrix} \alpha_x & s & x_0 \\ 0 & \alpha_y & y_0 \\ 0 & 0 & 1 \end{bmatrix} R[I \mid -C] \begin{bmatrix} X \\ Y \\ Z \\ 1 \end{bmatrix}$$

where X, Y, Z are the coordinates in the real scene, and (x, y) are the coordinates in the captured image. The variables $\alpha_x$, $\alpha_y$, s, $x_0$, and $y_0$ are the camera parameters. Additional details of the camera model can be found, for example, in Chapter 6 of Hartley and Zisserman, "Multiple View Geometry in Computer Vision", $2^{nd}$ edition, Cambridge University Press, 2004, which is herein incorporated by reference in its entirety. The camera parameters $\alpha_x$ and $\alpha_y$ are different from the shift parameters $\alpha_v$ previously discussed where subscript v represents left (L)- or right (R)-view. In the above equation, R is a 3×3 rotation matrix, I is a 3×3 identity matrix, C is a 3×1 translation matrix, and [I|-C] represents concatenation of the matrices to form a 3×4 matrix. When these parameters are known, the changes of x and y due to changes in depth Z can be easily derived. For simplicity, it can be assumed that R is identity matrix, that C=0, and that s=0. For these assumptions it is found that $$x - x_0 = \frac{a_x x}{Z}.$$

This suggests that the image scaling should be performed using the center of principle point as the origin. The change in Z is therefore determined according to shifting parameter $\alpha_v$.

FIG. 5 depicts changes in depth versus disparity for an object viewed in 3D. It is known that image shifting can change the perceived depth $Z_p$. There is a geometrical relationship between the image shift parameter $\alpha$ and the perceived depth $Z_p$ for a specific display as shown FIG. 5. In this figure, the left view is shifted to the left by $\alpha_L$ pixels, and the right view to the right by $\alpha_R$ pixels. As a result of this shift, the perceived depth of object O is changed from $Z_p$ to $Z_p'$. It is important to note that the perceived depth $Z_p$ is different from the depth in the real scene in that the perceived depth is a distorted version of Z due to different settings of cameras and displays. Z is the depth in the real scene before camera capture. Therefore, when determining the scaling factor $\gamma$, it is preferred that the transformation of $Z_p$ to Z is also considered. As a result, the exemplary process of determining the scaling factor $\gamma$ in scaling module 112 is as follows: the changes in $Z_p$ based on the shifting parameter $\alpha_v$ are calculated; $Z_p$ is mapped to Z according to the relationship of capture and display parameters; when Z is obtained by these calculations, then the changes in x and y are calculated.

In an alternative and possibly simpler approach, one can also determine the scale factor $\gamma$ by selecting a value from a predetermined range without extensive or accurate calculation. As an example, the shifting parameter $\alpha_v$ ($\alpha_R$ or $\alpha_L$) can be provided in a range from 0 to +60 to avoid potential viewing discomfort of the resulting stereo content, and the scaling parameter $\gamma$ can also be provided within a relatively small range, such as from 0.8 to 1.2. When the shifting operation pushes the scene back to the screen, a scaling factor can be selected to be less than 1. It should be understood that the farther away the scene is from the viewer, the smaller the scaling factor. When the scene is brought closer to the viewer, the scaling factor is selected to be larger than 1. It will be appreciated that the more a scene is brought up into the foreground, the larger the scaling factor.

As mentioned previously in connection with FIG. 3, the scaling of the scene can also be performed prior to the image shift. In one example, the scaling can be done based on a typical range of shift parameters applicable to most viewers based on known viewer's profiles and preferences, for example. In another example, the scaling can be done after receiving the control signal from the viewer, but before the image shifting operation. In this scenario, the scaling factor can be determined based on the shift parameters calculated based at least on the viewer's input in the control signal.

Figure 6:
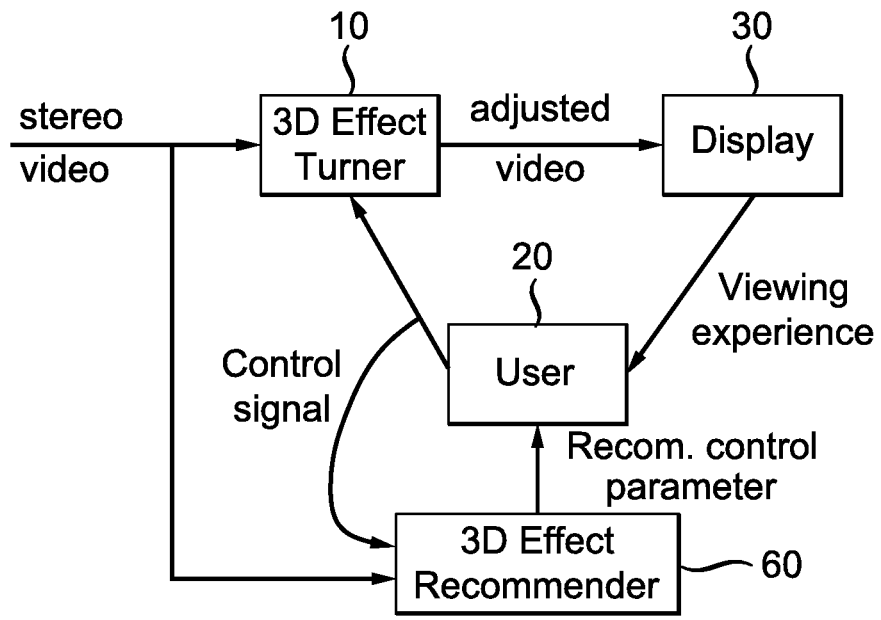
FIG. 6 shows an alternate embodiment of the system in FIG. 1 for adjusting the user 3D viewing experience realized in accordance with the principles of the present invention.

FIG. 6 shows an alternate embodiment of the system in FIG. 1 for adjusting the user 3D viewing experience realized in accordance with the principles of the present invention. In this configuration, a 3D effect recommender (3DER) module 60 is included with the elements shown for the system in FIG. 1.

Aside from a viewer selection of depth adjustment parameters based on their experience, another exemplary embodiment of the invention contemplates the use of a 3D effect recommender module 60. The 3DER 60 analyzes the content of the supplied input 3D video. Then, based on a user's disparity comfort profile, which can be obtained in advance and stored in the system, 3DER 60 compares the profile with the disparity characteristic analyzed from the supplied 3D video content to determine a best or optimal shift adjustment parameter for this particular user. The recommended shift adjustment parameter or control parameter is then supplied to the viewer user device 20. This recommended shift adjustment parameter can be a composite of $\alpha_L$ and $\alpha_R$, e.g., representing a total disparity change resulting from the shifts of the left and right views. The viewers can further adjust the recommended shift adjustment parameter based on their preference at the time, and the adjusted input (e.g., adjusted control parameter) is sent to the 3D effect tuner 10 via the control signal. As shown in FIG. 6, the control signal from user device 20 can be fed back to the 3DER 60 for use in updating the user disparity comfort profile in the 3DER 60.

The 3DER 60 uses the user disparity comfort profile to predict the comfort/discomfort level of a certain user watching a certain video, so that the control shift parameters can be selected to minimize visual discomfort for that viewer. This technique assists the viewer in making depth shift choices for viewing. Although not shown in the figure, the predicted shift parameters from 3DER 60 can also be supplied directly to 3D effect tuner 10, i.e., bypassing any viewer involvement (via user device 20) in selecting or adjusting the shift control parameter(s) predicted from the 3DER.

Figure 7:
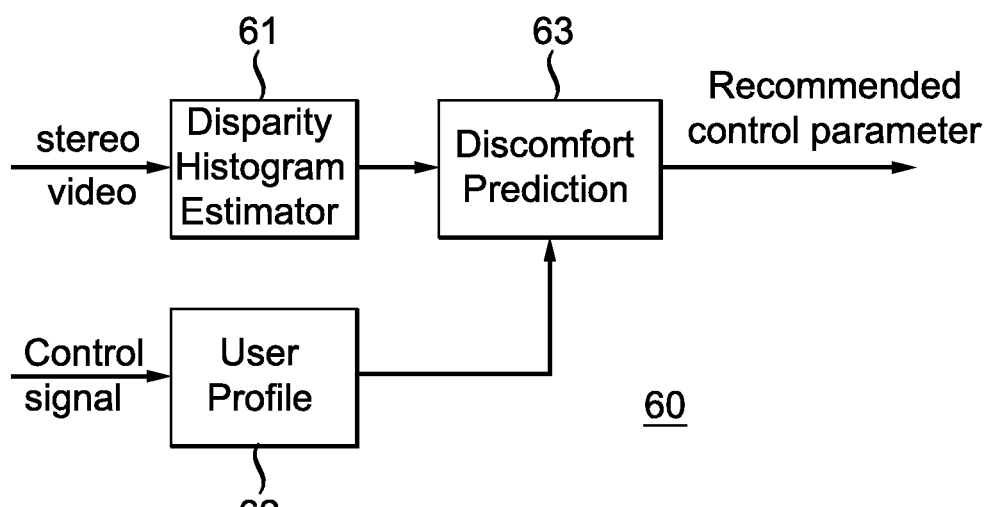
FIG. 7 depicts a more detailed block diagram of a 3D effect recommender element in FIG. 6 realized in accordance with the principles of the present invention.

FIG. 7 depicts a more detailed block diagram of a 3D effect recommender element in FIG. 6 realized in accordance with the principles of the present invention. As shown in FIG. 7, the 3DER includes a disparity histogram estimator 61, a user profile module 62, and a discomfort prediction module 63. Estimator 61 receives the stereo video images and it is coupled to discomfort prediction module 63. User profile module 62 receives the viewer control signal from user device 20. The output from user profile module 62 is coupled to discomfort prediction module 63. Discomfort prediction module 63 generates a recommended control parameter indicating a recommended amount of shift or depth change for the viewer. The operation of the 3DER will become more apparent with reference to the remaining figures as described below.

Figure 8A:
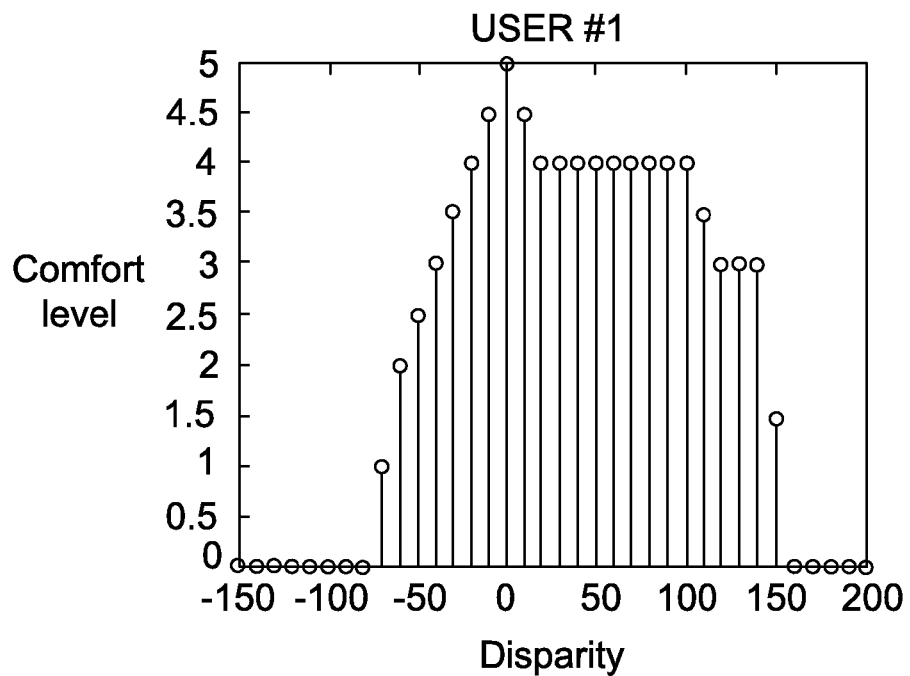
FIGS. 8A and 8B show graphs of comfort and discomfort level versus disparity for a user.
Figure 8B:
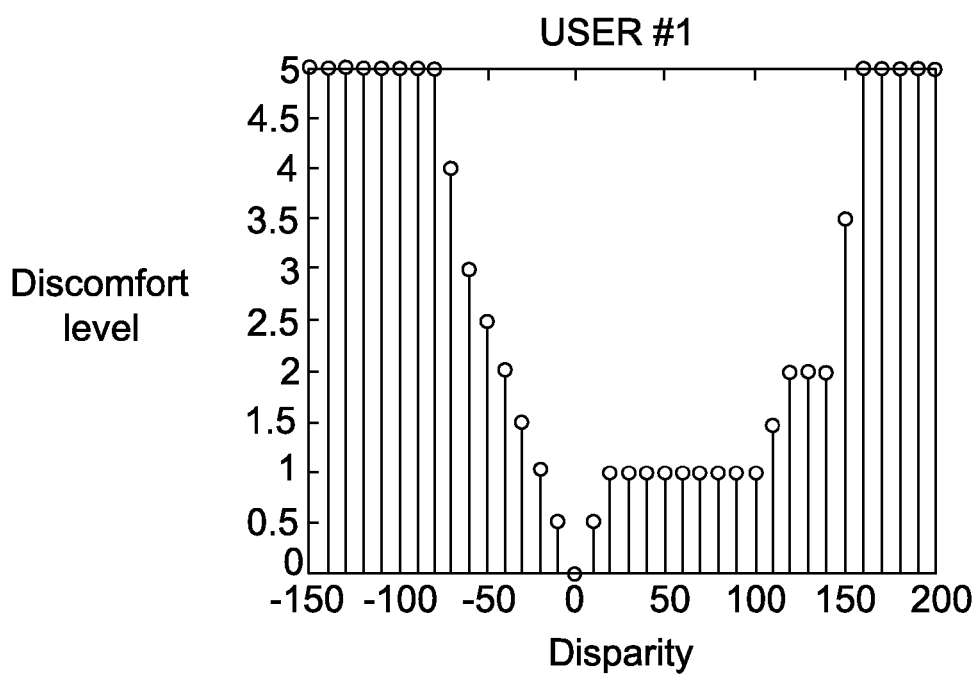

FIGS. 8a and 8b show graphs of comfort and discomfort level versus disparity for a user. A user disparity comfort profile can be constructed by conducting image shifting subjective tests for each viewer. A default or baseline profile may also be used in place of viewer testing to establish generally acceptable viewer comfort and discomfort levels for 3D viewing.

In an exemplary viewer comfort/discomfort test, selected 3D contents are shifted by predefined shifting amounts and are displayed for the viewer one by one. The viewer is then given an opportunity to rate the shifted 3D contents according to the viewer's own comfort level while watching such contents. The viewer's response concerning the comfort level is recorded for each of the shifting parameters tested. The viewer's comfort ratings generally are expected to range from a rating of very uncomfortable to a rating of very comfortable.

FIG. 8A is an example of the exemplary scores or comfort level rated by a user for disparity values from −300 to 200 with step size of 10 pixels. Since the comfort level from −150 to −300 remains at zero, they are omitted from the figure. In this example, a zero score means that the user is unable to fuse the left- and right-views; a score of 1 means that the user is very uncomfortable with the image; a score of 5 means that the user is very comfortable with the image; scores from 2-4 represent lesser degrees of discomfort and comfort. From the figure, it is seen that this particular viewer feels very comfortable when the disparity is 0, which is a 2D image. As the disparity becomes negative, which indicates an increased degree of the pop-up effect, the viewer starts to feel uncomfortable until the disparity reaches −80 (comfort level 0), at which point the viewer is unable to fuse the views.

Each comfort score corresponding to a disparity d can also be converted into discomfort scores by subtracting the comfort score from the highest comfort score as follows:

$$\text{discomfort score}_d = \text{highest comfort score}_d - \text{comfort score}_d$$

FIG. 8B shows the corresponding discomfort scores for the comfort score graph shown in FIG. 8A. FIGS. 8A-B are called viewer's disparity comfort and discomfort profiles. Since one graph is derivable from the other, it is contemplated that the data for only one graph be stored, especially if storage in the system is limited.

This collection process for the viewer disparity comfort profile described above may be easily built into a TV or a set-top box (STB) or other suitable display devices, such as portable devices. This would allow the viewer disparity comfort profile to be collected using a calibration process through TV or STB at viewer's home. This process is similar to TV's built in color or contrast adjustment process. Some predefined 3D test contents can be stored in the TV or STB. The image shifting values for testing may be predefined or modified by users. The viewers watch shifted 3D contents and then give their comfort/discomfort responses to the collection process. The responses are stored in the particular viewer's disparity comfort profile within the system.

Initially, a coarse user profile, such as a pre-defined disparity comfort profile having a larger disparity step size (e.g., compared to that shown in FIG. 8A), can be used. A more refined profile can be developed over time as the viewer adjusts or modifies the recommended depth (shift) control parameters provided by the 3DER since the 3DER receives the control signal ultimately sent from the viewer's control device.

Different users may have different profiles. When several individuals are viewing a stereo video image together, their profiles may be combined together into a more group profile, which can be stored and modified along with their own individual profiles.

In order to predict the discomfort score, the disparity distribution of the input stereo video is first analyzed in disparity histogram estimator 61. The disparity values for 3D contents may be pre-computed by the content provider and delivered to disparity histogram estimator 61 as metadata or as ancillary information along with the 3D video contents. Disparity histogram estimator 61 may also compute the disparity values for the video contents when delivered. Generally dense disparity values are preferred over sparse values. Sparse disparity values can be useful when high processing speed for the estimator 61 is a consideration.

Figure 9:
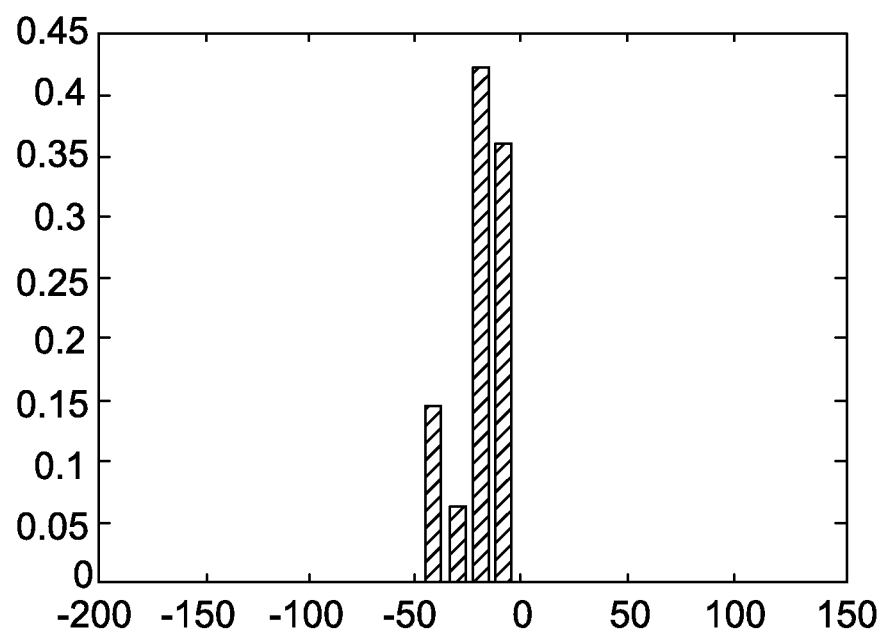
FIG. 9 shows an exemplary histogram plot for disparity extracted from 3D content images.

FIG. 9 shows an exemplary histogram plot (normalized) for disparity related to 3D video content. Data from such a histogram is of the type generated by estimator 61. By inspection of the histogram plot, it is seen whether a non-trivial portion of the content pixels have large disparity d. This case becomes an important issue when the viewers have a disparity comfort profile limits that are smaller than d since these viewers would feel discomfort when viewing the associated video content.

For example, according to the data in FIG. 8, the viewer does not feel comfortable watching regions with disparity beyond −40. As a result, the 15% of the video content in FIG. 9 whose disparity value is around −40 would cause problem for this particular viewer. On the other hand, the 37% of the video content having a disparity near −10 is not expected to cause much eye strain or discomfort for this viewer. Following this analysis, a 3DER 60 using its discomfort prediction module 63 can predict that, if the content disparities are distributed within [−20, 100], which corresponds to a discomfort level at or below level 1 (or a comfort level at or above a level 4), this viewer should feel very comfortable while watching the 3D video content. Since the content analyzed in FIG. 9 does not meet this criteria, 3DER 60 would generate a recommended control parameter for depth shifting to provide shifting of the video images inside the screen by around 20 to 100 pixels.

A visual discomfort prediction technique for use in discomfort prediction module 63 of 3DER 60, for example, incorporates an individual viewer's disparity comfort profile and the disparity distribution of the content presented to the viewer. The discomfort prediction score $S_{ij}$ for user i at scene j is the weighted sum of the normalized disparity distribution $D_j$ of the scene j. The weight is determined by each viewer's disparity discomfort profile $F_{Di}$, i=1, . . . , N. That is, $S_{ij} = \Sigma_{d\ min}^{d\ max} F_{Di}(d) \times D_j(d)$, where $d_{min}$ and $d_{max}$ correspond to the lower and upper limits of d, respectively. In one embodiment, $|d_{min}| = |d_{max}|$. However, in general, the two limits do not have to be equal in magnitude. Note that here $F_{Di}$ is a profile with the discomfort score value 0 at 0 disparity (see FIG. 8B).

For most scenes, regions exhibiting small disparities account for high portion of the content. These regions generally include background areas, for example. These areas usually do not cause visual discomfort and thus, they can be minimized or downplayed in their effect by assigning a weight close to 0. On the other hand, since other regions of a scene or image having much higher disparity values would cause noticeable and even severe visual discomfort, though the account for a much smaller portion of the image content, these other regions would be given a higher weight highlight their effects.

In one embodiment, the output of the 3DER can be a shift adjustment parameter $s_{ij}^*$ supplied to user device 20 or 3D effect tuner 10 that minimizes the viewer's discomfort score $S_{ij}$, where $s_{ij}^*$ is defined as:

$$s_{ij}^* = \arg\min_s S_{ij}(s) = \arg\min_s \Sigma_{d\ min}^{d\ max} F_{Di} \times D_j(d+s).$$

In other words, $s_{ij}^*$ represents the value of shift adjustment parameter "s" that produces the minimum discomfort score $S_{ij}(s)$ for viewer i at a scene j. This parameter $s_{ij}^*$ is a composite of the shift parameters for the right and left views ($\alpha_R$ and $\alpha_L$), and it is understood that $s_{ij}^*$ can be expressed as a sum or difference of $\alpha_R$ and $\alpha_L$, depending on the sign convention used for parameters $\alpha_R$ and $\alpha_L$ corresponding to different shift directions. In one embodiment, $\alpha_R$ and $\alpha_L$ are equal in magnitude, but represent shifting in opposite direction.

In the analysis performed by estimator 61, it is possible for the 3DER to analyze every scene of a video stream instead of single scenes or a portion of the entire video sequence. Also, the analysis by estimator 61 can be applied and limited to one or more specific regions of interest in a scene, since regions of interest are understood to be those areas of a scene on which the viewer will concentrate.

In experimental practice, the inventors conducted a subjective test on a group of viewers. The test obtained the comfort level of each viewer for different disparity values applied to 3D content. The test sequence is generated using Maya software and the content consisted of only one object, a bullet, flying from left to right in front of a black background. The depth was maintained constant. Disparity value ranged from −300 to 200 pixels with step size 20. For each of the disparity value, the viewer was asked to provide a comfort score from 0 to 5, with the zero score indicating an inability to fuse, a score of 1 indicating the most uncomfortable, and a score of 5 indicating most comfortable. This range included the condition when the viewer was unable to fuse the left and right images into a single image. The results of this subjective test permitted the construction of a profile for each viewer. This profile was called the Disparity Discomfort Profile (DDP), $F_{Di}$.

With the DDP obtained for each viewer, a method was used to predict the visual discomfort level for a given viewer when that viewer is presented with some content. First, the content was analyzed to output the disparity histogram for each scene in the content. This was done by using a disparity estimation method well known in the art. The visual discomfort prediction technique incorporates the obtained DDP for a viewer and the disparity distribution in a scene of the content. The discomfort prediction score $S_{ij}$ for user or viewer i at scene j is computed as the weighted sum of the normalized disparity distribution $D_j$ of the scene j. The weight is determined by each user's DDP, $F_{Di}$.

The subjective test was also conducted with the same group of users on one scene from HD stereo content from the exemplary 3D movie entitled "Beowulf". The viewers were asked to provide a discomfort score from 0 to 5 with 0 being the most uncomfortable. Results showed that the prediction from the technique employed in 3DER via discomfort prediction module 63, matched very well with the subjective test for many of the tested viewers.

All examples and conditional language recited herein are intended for pedagogical purposes to aid the reader in understanding the present principles and the concepts contributed by the inventor to furthering the art, and are to be construed as being without limitation to such specifically recited examples and conditions.

Moreover, all statements herein reciting principles, aspects, and embodiments of the present invention, as well as specific examples thereof, are intended to encompass both structural and functional equivalents thereof. Additionally, it is intended that such equivalents include both currently known equivalents as well as equivalents developed in the future, including any elements developed at any that perform the same function, regardless of structure.

A number of implementations have been described herein. Nevertheless, it will be understood that various modifications may be made. For example, elements of different implementations may be combined, supplemented, modified, or removed to produce other implementations. Additionally, one of ordinary skill will understand that other structures and processes may be substituted for those disclosed and the resulting implementations will perform at least substantially the same function(s), in at least substantially the same way(s), to achieve at least substantially the same result(s) as the implementations disclosed. In particular, although illustrative embodiments have been described herein with reference to the accompanying drawings, it is to be understood that the present principles is not limited to those precise embodiments, and that various changes and modifications may be effected therein by one of ordinary skill in the pertinent art without departing from the scope or spirit of the present principles. Accordingly, these and other implementations are contemplated by this application and are within the scope of the following claims.

The invention claimed is:

1. A method comprising:
   receiving at least a first stereoscopic image pair having a first view and a second view, the first and second views including at least a pair of corresponding pixels separated by a first horizontal disparity;
   generating a control signal responsive to input received about a plurality of viewing preferences;
   determining if the viewing preferences received have been previously stored in a user profile and using said viewing preferences from said stored user profile when said user profile exists as a basis to adjust said control signal in order to produce adjusted first and second views according to said viewing preferences;
   calculating depth changes to said first or second view based on said control signal, when a user profile does not exist or when said viewing preferences received are different than said viewing preferences in said user profile;
   wherein said calculation includes providing a control parameter representative of a recommended depth change, the control parameter being based at least on the disparity distribution and a determined user established adjustment parameter based on said received viewer preferences;
   determining a shift parameter based, at least in part, on the control signal and determining a scale factor based, at least in part, on the shift parameter, and adjusting, in response to said calculation and the shift parameter via an effect tuner,
      sizes of the first and second views by the scale factor and
      the first horizontal disparity to a second horizontal disparity in order to produce adjusted first and second views according to said viewing preferences.

2. The method according to claim 1, wherein the adjusting of the first horizontal disparity comprises:
   determining the shift parameter including a first view shift parameter and a second view shift parameter;
   shifting horizontally the first and second views by respective amounts related to the first and second view shift parameters, wherein the pair of corresponding pixels in the shifted first and second views exhibit the second horizontal disparity.

3. The method according to claim 2, wherein the adjusting of the sizes of the first and second views further comprises:
   determining the scale factor based, at least in part, on the shift parameter; and
   changing, by an amount dependent on the scale factor, a size of at least a portion of the stereoscopic content for each of the first and second views.

4. The method according to claim 1, wherein the adjusting comprises:
   changing, by an amount dependent on the scale factor, a size of at least a portion of the stereoscopic content for each of the first and second views of at least the first stereoscopic image pair.

5. The method according to claim 4, wherein the shift parameter includes a first view shift parameter and a second view shift parameter, and wherein the adjusting of the first horizontal disparity further comprises:
   shifting horizontally the first and second views by respective amounts related to the first and second view shift parameters, wherein the pair of corresponding pixels in the shifted first and second views exhibit the second horizontal disparity.

6. The method according to claim 4, further comprising:
   prior to determining the shift parameter, changing a resolution of each of the first and second views by an amount dependent on a view scaling factor.

7. The method according to claim 2, further comprising:
   displaying the image pair of adjusted first and second views.

8. The method according to claim 1, further comprising:
   analyzing one or more of the stereoscopic image pairs to determine a disparity distribution over at least a portion of each image in the stereoscopic image pairs;
   wherein said control parameter is provided based on recommended depth change, the control parameter being based, at least in part, on the disparity distribution and at least one viewer discomfort profile, each viewer discomfort profile representing discomfort level over a range of horizontal disparities and being associated with at least one of a particular viewer or a particular group of viewers.

9. The method according to claim 4, further comprising:
   analyzing one or more of the stereoscopic image pairs to determine a disparity distribution over at least a portion of each image in the stereoscopic image pairs;
   identifying if a lookup table exists listing viewer with control parameters already existing in the look up table; and
   establishing a viewer and at least one viewer profile based on previous viewer preferences received and responsive to adjustments made relating to said viewer preferences, each viewer profile representing preferences and a calculated comfort level, established using viewer preferences, over a range of horizontal disparities and being associated with at least one of a particular viewer or a particular group of viewers having a viewer profile.

10. The method according to claim 8, wherein the control parameter is included in the control signal.

11. The method according to claim 8, further comprising:
    sending the control parameter to a viewer device associated with the viewer discomfort profile, the control parameter for use in generating a viewer-adjusted control parameter for inclusion in the control signal at the viewer device.

12. The method according to claim 8, further comprising:
    updating the at least one viewer discomfort profile based at least in part on the control signal.

13. The method according to claim 10 further comprising:
    updating the at least one viewer discomfort profile based at least in part on the control signal.

14. The method according to claim 11 further comprising:
    updating the at least one viewer discomfort profile based at least in part on the control signal.

15. The method according to claim 2, wherein the control signal includes information for indicating an amount of depth change for application to the stereoscopic content.

16. The method according to claim 15, wherein the control signal includes an identification signifying at least one of a particular viewer or a particular group of viewers.

17. A system comprising:
at least one processor configured to: receive at least a first stereoscopic image pair having a first view and a second view, the first and second views including at least a pair of corresponding pixels separated by a first horizontal disparity;
determine if viewer preferences associated with a viewer have been previously stored in a user profile and, if the viewing preferences have been stored, using said stored user profile as a basis to adjust a control signal generated based on the viewing preferences of the viewer;
when said user profile is not previously stored or when said user profile has different stored viewing preferences than those received, calculate based on the control signal, depth changes to the first or second view based on a control parameter provided on at least the disparity distribution and a comfort level determination established adjustment parameter based on said received viewing preferences;
determine a shift parameter based, at least in part, on the control signal;
determine a scale factor based, at least in part, on the shift parameter; and
adjust, via an effect tuner, in response to the shift parameter;
sizes of the first and second views by the scale factor and
the first horizontal disparity to a second horizontal disparity in order to produce adjusted first and second views; and
establish or input said adjustment in the user profile associated with the viewer or set of viewers.

18. The system according to claim 17, wherein the at least one processor is further configured to:
determine the shift parameter including a first view shift parameter and a second view shift parameter; and
shift horizontally the first and second views by respective amounts related to the first and second view shift parameters, so that the pair of corresponding pixels in the image pair exhibit the second horizontal disparity.

19. The system according to claim 18, wherein the at least one processor is further configured for:
determine the scale factor based, at least in part, on the shift parameter; and
change by an amount dependent on the scale factor, a size of at least a portion of the stereoscopic content for each of the first and second views.

20. The system according to claim 19, wherein the at least one processor is further configured to:
prior to determining the shift parameter, change a resolution of each of the first and second views by an amount dependent on a view scaling factor.

21. The system according to claim 17, wherein the at least one processor is further configured to:
change, by an amount dependent on the scale factor, a size of at least a portion of the stereoscopic content for each of the first and second views.

22. The system according to claim 21, wherein the shift parameter includes a first view shift parameter and a second view shift parameter, and wherein the at least one processor is further configured to:
shift horizontally the first and second views by respective amounts related to the first and second view shift parameters, wherein the pair of corresponding pixels in the shifted first and second views exhibit the second horizontal disparity.

23. The system according to claim 21, wherein the at least one processor is further configured to:
prior to determining said shift parameter, change a resolution of each of the first and second views by an amount dependent on a view scaling factor.

24. The system according to claim 17, wherein the control signal includes information for indicating an amount of depth change for application to the stereoscopic content.

25. The system according to claim 24, wherein the control signal includes an identification signifying at least one of a particular viewer or a particular group of viewers based on previously submitted user preferences.

26. The system according to claim 17, further comprising:
a display for displaying the at least one stereoscopic image pair with the adjusted first and second views from the processor to a viewer.

* * * * *